April 30, 1940.                G. W. STROEBEL                2,199,250
                ELASTIC FLUID TURBINE PACKING ARRANGEMENT
                         Filed March 29, 1938

Inventor:
George W Stroebel,
by Harry E. Dunham
His Attorney.

Patented Apr. 30, 1940

2,199,250

UNITED STATES PATENT OFFICE 2,199,250

ELASTIC FLUID TURBINE PACKING ARRANGEMENT

George W. Stroebel, Schenectady, N. Y., assignor to General Electric Company, a corporation of New York Application March 29, 1938, Serial No. 198,669

1 Claim. (Cl. 286—10)

The present invention relates to elastic fluid turbine packing arrangements for reducing leakage of elastic fluid along the shaft past the turbine casing. More specifically, the invention relates to the type of packing which includes the combination of vapor and liquid sealing means. Thus, in the casing of a steam turbine this combination preferably consists of a combined steam and water packing.

The object of the invention is to provide an improved packing arrangement whereby an elastic fluid turbine may be effectively sealed.

For a consideration of what I believe to be novel and my invention, attention is directed to the following description and the claim appended thereto in connection with the accompanying drawing.

Figure 1:
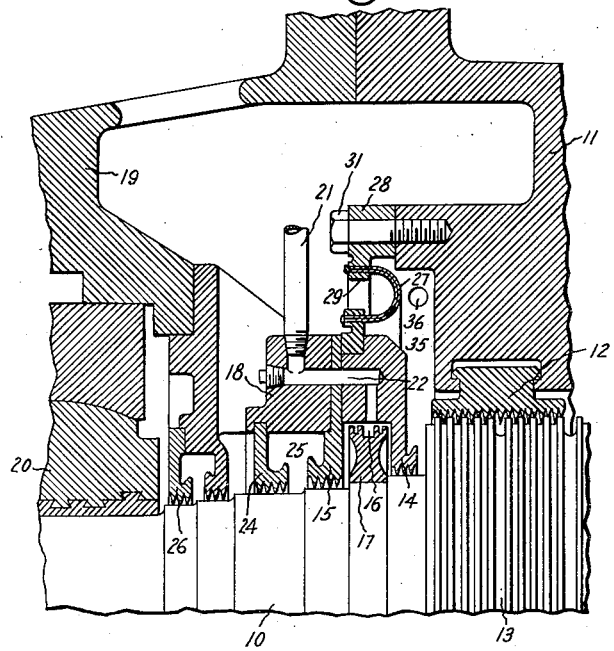
Figure 2:
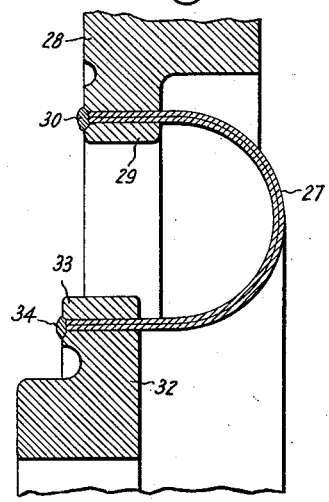

In the drawing, Fig. 1 illustrates a sectional view, partly broken away, of an elastic fluid turbine packing according to my invention, and Fig. 2 is an enlarged detail view of Fig. 1.

The arrangement comprises a turbine shaft 10 projecting through an opening in a turbine casing 11. The bucket wheels, not shown, are secured to the shaft on the right-hand side in the drawing. The packing comprises an elastic fluid or steam packing indicated by a single toothed packing element 12 held on the casing 11 with its teeth in cooperative relation with a grooved shaft portion 13. A liquid or water packing arranged adjacent the steam packing comprises a water packing casing having two halves or portions 14 and 15 forming a chamber 16. An impeller or deflector 17 is disposed in the chamber 16 and secured to the shaft 10. The water packing casing halves 14, 15 are secured to a support 18 which in turn is held by a bracket 19 on the turbine casing 11. The brackets 19 also form a support for a shaft bearing 20 for the left-hand end portion of the shaft 10. Water is supplied to the water packing chamber 16 through a conduit 21 connected to a channel 22 formed in a portion of the support 18 and the casing halves 14, 15. The water packing casing halves 14, 15 have inner grooved surfaces in packing engagement with the shaft to reduce leakage of water from the water chamber 16.

During operation, water supplied to the chamber 16 is rotated by action of the impeller to form a seal between the latter and the water packing casing. The water is discharged through a suitable opening (not shown). The water packing casing half 15 together with a toothed packing member 24 held on the support 18 form a water drain chamber 25. Water leaking past the packing surfaces between the casing half 15 and the shaft into the chamber 25 is drained therefrom through suitable openings, not shown. The support 18 and a ring 26 held thereon also form packing surfaces with the shaft 10 to reduce leakage of lubricant from the bearing 20 along the shaft into the water packing chamber.

An important feature of my invention is the provision of a flexible seal between the water packing and the steam packing. This flexible seal comprises an annular sealing member 27 made from laminated sheet metal. The sealing member 27 has outer and inner concentrically spaced cylindrical walls connected by a curved wall. During manufacture of the sealing member a number of sheet metal rings are spun over a form to a channel shape. The edge of the outer cylindrical wall of the member 27 is secured to a flange 28 by means of a ring 29 and a weld 30. The flange 28 is fastened to the turbine casing by bolts 31. The edge of the inner cylindrical wall of the sealing member 27 is secured to a clamping ring 32 by means of a ring 33 and a weld 34, the clamping ring 32 being clamped between the water packing casing halves 14, 15. With this arrangement a chamber 35 is formed between the water packing casing and the turbine casing for receiving fluid leaking past the steam packing 12, 13, fluid being discharged from the chamber 35 through a discharge opening 36.

Thus, with my invention the leakage of elastic fluid past the steam packing into the power plant, that is, into the atmosphere, is completely prevented. During operation, the water packing casing due to its lower temperature expands at a rate different from the expansion of the turbine casing. Excessive stresses and strains due to such difference in expansion are prevented by the provision of the flexible sealing member 27 between the turbine casing 11 and the water packing casing 14, 15.

What I claim as new and desire to secure by Letters Patent of the United States is:

A sealing arrangement between concentrically spaced walls comprising an inner and an outer wall concentrically spaced, a sealing member U-shaped in cross-section and composed of several U-shaped sheets of flexible material having parallel inner and outer legs with the inner leg engaging the inner wall and the outer leg engaging the outer wall, and means for sealing the legs to the walls comprising inner and outer rings parallel to and engaging the legs of the sealing member opposite to the corresponding walls and annular welds securing the edges of the sealing member to the corresponding ring and wall.

GEORGE W. STROEBEL.